UNITED STATES PATENT OFFICE 2,519,708

TETRA - (CARBOXYALKYL) - 1:2-DIAMINO-CYCLOHEXANES AND A PROCESS OF MAKING SAME

Hans Schläpfer and Jakob Bindler, Basel, Switzerland, assignors to J. R. Geigy A. G., Basel, Switzerland, a Swiss firm No Drawing. Application February 11, 1949, Serial No. 75,964. In Switzerland February 17, 1948

3 Claims. (Cl. 260—514)

This invention is concerned with new 6-membered alicyclic 1,2-(N,N'-tetra-acetic acid)-diamino compounds.

It is known that organic nitrogen compounds with more than one acetic acid radical attached to a basic nitrogen atom have the property of preventing the formation of precipitates of the alkaline earth, earth and heavy metal salts or of redissolving precipitates of these metals which have already formed. Specially outstanding among the group of such active substances is ethylenediamine-N,N'-tetra-acetic acid. It is used in the textile industry for rendering harmless the hardness factors in the water and is very effective for such purposes, especially for counteracting the harmful effect of disturbing heavy metal ions in chrome dyeing. In comparison with this compound all the other organic N-polyacids suggested are of minor importance and have mostly a much smaller activity. This applies in particular to the N-polyacetic acids of the aromatic series.

The unexpected and surprising discovery has now been made that the 6-membered alicyclic 1,2-(N,N'-tetra-acetic acid)-diamino compounds possess the useful properties mentioned above in a highly favourable degree.

The new compounds correspond to the formula

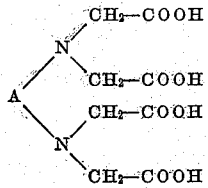

wherein A represents a cyclohexyl radical or its homologues, carrying the above indicated amino groups in ortho-position to one another. Compounds containing the cyclohexyl radical or its lower homologues are preferred.

It is remarkable that in spite of their higher molecular weight, these alicyclic 1,2-(N,N'-tetra-acetic acid)-diamino compounds are quite as active as ethylenediamine-N,N'-tetra-acetic acid. Indeed in some cases they even surpass it.

The new cyclohexyl-1,2-(N,N'-tetra-acetic acid)-diamino compounds are obtained from cyclohexyl-1,2-diamino compounds by treatment with at least 4 molecular proportions of reactive acetic acid derivatives. Instead of the free carboxyl group these derivatives may contain modified carboxyl groups which are finally converted to the free groups. As examples of substituted acetic acids reactive at the α-position, may be mentioned: monochlor-acetic acid and monobrom-acetic acid. By compounds with modified carboxyl groups are to be understood the esters, amide and nitrile of halogen acetic acids, also cyanhydrin of formaldehyde, which it is advantageous to prepare from its components immediately before using it in the claimed reaction. The conversion of the modified carboxyl groups to the free carboxyl groups is brought about by acid or, preferably, alkaline hydrolysis. In the condensation of the cyanohydrin of formaldehyde with 1,2-diamino-cyclohexyl hydrocarbons the alkaline hydrolysis of the cyano group may be brought about during the course of the condensation itself according to the method of the U. S. Patent No. 2,387,735. The 1,2-diamino-cyclohexyl compounds serving as starting materials for the manufacture of the new compounds are obtained from anthranilic acid alkyl esters by reduction with metallic sodium (according to Ladenburg) to the 1-amino-cyclohexyl-2-carboxylic acid alkyl esters. The latter are transformed into the corresponding carboxylic acid amides by the usual methods and the amides are subjected to the Hofmann degradation.

The new cyclohexyl - 1,2 - (N,N'-tetra-acetic acid)-diamino compounds are white powders whose alkali salts dissolve well in water and have the property of keeping the hardness factors of water and interfering heavy metal ions in solution in the form of complex compounds, or of redissolving precipitates which have already formed. They are thus very well suited for use in the textile industry for such purposes.

The following examples to which, however, the invention is not restricted, give details of the preparation and use of the new compounds. Unless otherwise stated, parts are by weight and temperatures are in degrees centigrade.

Example 1

95 parts of chloracetic acid are dissolved in 200 parts of water at 0° and neutralised at a maximum of 10° with 135 parts of 30% caustic soda lye. 24 parts of 1,2-diamino-cyclohexane are then added, and the mixture warmed to 70°. During the reaction 135 parts of 30% caustic soda lye are added in drops so that the whole is continuously alkaline. Finally, the reaction mixture is stirred for 5 hours at 90–95°, filtered and the filtrate made acid to Congo red with 200 parts of fuming hydrochloric acid. 1,2-diamino-cyclohexane-N,N'-tetra-acetic acid crystallises out as well developed colourless crystals.

Instead of 1,2-diaminocyclohexane the corresponding amount of 1,2-diamino-1-, -3- or -4-methyl- or -3-n-propyl-cyclohexane or 1,2-diamino-3,4- or -3,5-dimethyl-cyclohexane may also be used.

Example 2

57 parts of 1,2-diaminocyclohexane, 12 parts of caustic soda and 75 parts of water are heated under reduced pressure at 70° to boiling, in a vessel fitted with a reflux condenser. Six lots of 60 parts of sodium cyanide solution (30.5%) are then added dropwise and alternately with 6 lots of 27.5 parts of formaldehyde solution (37.6%). Finally another 31 parts of formaldehyde (37.6%) are added and the reaction mixture heated at the boil for another 6 hours until no more ammonia is evolved. After the reaction is over the solution is somewhat diluted with water and made acid to Congo red with 300 parts of hydrochloric acid, whereupon 1,2-diaminocyclohexane-N,N'-tetra-acetic acid crystallises out.

Example 3

171 parts of 1,2-diaminocyclohexane are mixed with 250 parts of water and 2 parts of calcium cyanide dissolved in 20 parts of water are added. Next, while cooling, first 80 parts of hydrogen cyanide are added in drops and then, at 15–25°, 300 parts of 30% formaldehyde solution. After an interval another 80 parts of hydrogen cyanide, followed by 300 parts of 30% formaldehyde solution are added. The 1,2-diaminocyclohexane-tetra-acetonitrile formed is hydrolysed at 80–90° by adding 240 parts of caustic soda in 560 parts of water. After the reaction is over, the reaction mixture is filtered and the filtrate acidified with hydrochloric acid. 1,2-diaminocyclohexane-N,N'-tetra-acetic acid crystallises out. Instead of 1,2-diaminocyclohexane, the corresponding amount of 1,2-diamino-4-n-butylcyclohexane may also be used.

Example 4

To water of 22.5° (English hardness) are added 2 g. per litre of the sodium salt of 1,2-diaminocyclohexane-N,N'-tetra-acetic acid. A small amount of sodium carbonate is added to ensure a distinctly alkaline reaction. If 1–2 g. of soap are added to the hot solution a clear, strongly foaming solution is obtained with very good washing properties. Even on boiling with sodium carbonate or caustic soda lye no separation of calcium carbonate or lime soap occurs.

Example 5

A piece of cotton cloth, which through repeated soap-washing in hard water has accumulated a considerable lime soap precipitate, is washed at the boil for 1 hour in an alkaline liquor containing 5 g. per litre of the compound mentioned in Example 1. After rinsing and drying the cloth proves to be practically free of lime soap.

Example 6

Bleached cotton washing is repeatedly washed at the boil with soap and soda in strongly ferruginous condensed water containing 0.05% of the sodium salt of 1,2-diaminocyclohexane-N,N'-tetra-acetic acid. The goods are pure white, whereas the same washing without the additive becomes stained yellowish-brown because of the precipitation of iron compounds.

Example 7

Wool is dyed for 30 minutes with 1% of the dyestuff of Example 2 of British Patent Specification No. 445,999 in the presence of 0.2 g. of Mohr's salt, 3 g. Glauber's salt and 2 g. of the compound obtained as described in Example 1 above per litre of dye liquor, the dyebath being brought to a pH of 4.5 by means of acetic acid (1:10). Next, 1% of sulphuric acid and 0.5% of potassium bichromate are added and chroming completed in the usual way.

A beautiful blue shade is obtained. Without the addition of the sodium salt of 1,2-diaminocyclohexane-N,N'-tetra-acetic acid the result is a poor-looking reddish-brown dyeing.

What we claim is:

1. A 1,2-diamino-cyclohexane derivative corresponding to the formula

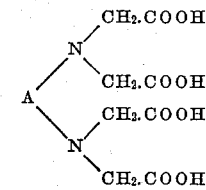

wherein A represents a member selected from the group consisting of a cyclohexyl radical and its homologues.

2. 1,2-diamino-cyclohexane-N,N'-tetra-acetic acid.

3. 1,2-diamino-4-methylcyclohexane-N,N'-tetra-acetic acid.

HANS SCHLÄPFER.
JAKOB BINDLER.

REFERENCES CITED

The following references are of record in the file of this patent:

UNITED STATES PATENTS

| Number | Name | Date |
| --- | --- | --- |
| 2,195,974 | Reppe et al. | Apr. 2, 1940 |
| 2,428,353 | Bersworth | Oct. 7, 1947 |